(12) United States Patent
Forero et al.

(10) Patent No.: US 9,658,318 B2
(45) Date of Patent: May 23, 2017

(54) SPARSITY-DRIVEN PASSIVE TRACKING OF ACOUSTIC SOURCES

(71) Applicant: THE UNITED STATES OF AMERICA AS REPRESENTED BY THE SECRETARY OF THE NAVY, Washington, DC (US)

(72) Inventors: Pedro A. Forero, San Diego, CA (US); Paul A. Baxley, San Diego, CA (US)

(73) Assignee: THE UNITED STATED OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 0 days.

(21) Appl. No.: 15/008,322

(22) Filed: Jan. 27, 2016

(65) Prior Publication Data
US 2016/0139245 A1    May 19, 2016

Related U.S. Application Data

(63) Continuation-in-part of application No. 14/285,400, filed on May 22, 2014, now Pat. No. 9,264,809.

(51) Int. Cl.
| | | |
|---|---|---|
| *H04R 3/00* | (2006.01) | |
| *G01S 5/22* | (2006.01) | |
| *G01S 5/18* | (2006.01) | |
| *G01S 3/808* | (2006.01) | |
| *H04R 1/40* | (2006.01) | |

(Continued)

(52) U.S. Cl.
CPC ...... *G01S 5/22* (2013.01); *G01S 5/18* (2013.01); *G01S 3/808* (2013.01); *G01S 15/04* (2013.01); *G01V 1/001* (2013.01); *H04R 1/406* (2013.01); *H04R 1/44* (2013.01); *H04R 3/005* (2013.01)

(58) Field of Classification Search
CPC .... G01S 5/22; G01S 5/18; G01S 3/808; G01S 15/04; H04R 3/005; H04R 29/005; H04R 1/44; H04R 1/406; G01V 1/001; G06N 7/00; G06F 17/14

See application file for complete search history.

(56) References Cited

U.S. PATENT DOCUMENTS

| | | |
|---|---|---|
| 9,264,809 B2 | 2/2016 | Forero et al. |
| 9,384,447 B2 | 7/2016 | Forero et al. |

(Continued)

OTHER PUBLICATIONS

A. Beck and M. Teboulle, "A fast iterative shrinkage-threshoiding algorithm for linear inverse problems," SIAM Journal on Imaging Sciences, vol. 2, No. 1, pp. 183-202, 2009.

(Continued)

*Primary Examiner* — Andrew L Sniezek
(74) *Attorney, Agent, or Firm* — Spawar Systems Center Pacific; Kyle Eppele; Ryan J. Friedl

(57) ABSTRACT

A system and a method involve acoustic source localization for multiple acoustic sources using passive sonar. Tracks are constructed based on source location maps (SLMs) that reveal the locations of the sources over a grid of tentative source locations. The proposed estimator for the SLMs performs coherent processing of broadband acoustic measurements, capitalizes on the sparse structure of the SLMs, and uses the prior SLM estimate to capture temporal information about the locations of the sources.

18 Claims, 12 Drawing Sheets

(51) Int. Cl.
*G01S 15/04* (2006.01)
*H04R 1/44* (2006.01)
*G01V 1/00* (2006.01)

(56) References Cited

U.S. PATENT DOCUMENTS

2011/0007606 A1* 1/2011 Curtis .................. G01S 15/04
  367/103
2011/0144930 A1* 6/2011 Bruno .................. G01S 3/801
  702/56

OTHER PUBLICATIONS

H. Bucker, "Matched-field tracking in shallow water," J. Acoust. Soc. Am., vol. 96, No. 6, pp. 3809-3811, 1994.
S. E. Dosso and M. J. Wilmut, "Bayesian acoustic source track prediction in an uncertain ocean environment," IEEE J. Ocean. Eng., vol. 35, No. 4, pp. 811-820, Oct. 2010.
S. Farahmand, G. B. Giannakis, G. Leus, and Z. Tian, "Tracking target signal strengths on a grid using sparsity," EURASIP Journal on Advances in Signal Processing, vol. 2014, No. 1, 2014.
L. T. Fialkowski, J. S. Perkins, M. D. Collins, M. Nicholas, J. A. Fawcett, and W. Kuperman, "Matched-field source tracking by ambiguity surface averaging," J. Acoust. Soc. Am., vol. 110, No. 2, pp. 739-746, 2001.
J. Filos, E. Karseras, W. Dai, and S. Yan, "Tracking dynamic sparse signals with hierarchical Kalman filters: A case study," in Proc. of 18th International Conference on Digital Signal Processing, Jul. 2013, pp. 1-6.
P. A. Forero, "Broadband underwater source localization via multitask learning," in Proc. of 48th Annual Conference on Information Sciences and Systems, Mar. 19-21, Princeton Univ., Princeton, NJ, 2014, pp. 1-6.
P. A. Forero and P. A. Baxley, "Shallow-water sparsity-cognizant source location mapping," J. Acoust. Soc. Am., vol. 135, No. 6, pp. 3433-3501, 2014.
E. Karseras, K. Leung, and W. Dai, "Tracking dynamic sparse signals using hierarchical Bayesian kalman filters," in Proc. of IEEE International Conference on Acoustics, Speech and Signal Processing, May 2013, pp. 6546-6550.
M. B. Porter, The Kraken Normal Mode Program, SACLANT Undersea Research Centre Memorandum (SM-245) and Naval Research Laboratory Mem. Report 6920, 1991.
M. J. Wilmut, J. M. Ozard, K. O'Keefe, and M. Musil, "A piecewise matched-field tracking algorithm," IEEE J. Ocean. Eng., vol. 23, No. 3, pp. 167-173, Jul. 1998.
M. J. Wilmut, J. M. Ozard, and B. Woods, "An efficient target tracking algorithm for matched field processing," in Proc. of Oceans '93, Engineering in Harmony with Ocean, Oct. 1993, pp. III/81-III/85 vol. 3.

\* cited by examiner

Algorithm 1 PG solver for (5).

Require: Tuning parameters $\mu > 0$ and $\check{S}(t-1)$.
1: for $\iota = 1, 2, ..., $ do
2: {These updates can be parallelized}
3: for $g = 1, ..., G$ do
4: Compute $d_g^{[\iota-1]}(t)$ via (11).
5: Compute $w_g^{[\iota-1]}(t)$ via (10).
6: Update $\check{v}_g^{[\iota]}(t)$ via (13).
7: end for
8: end for

900

Algorithm 2 APG solver for (Eq. 6).

Require: Tuning parameters $\lambda, \mu > 0$ and $\breve{S}(t-1)$.
1: Let $\breve{S}^{[\iota]} := [\breve{S}_1^{[\iota]}, ..., \breve{S}_F^{[\iota]}]$ and $\Omega^{[\iota]} := [\omega_1^{[\iota]}, ..., \omega_F^{[\iota]}]$.
2: Set $\Omega^{[\iota]} = S(t-1)$ and $\zeta^{[\iota]} = 1$.
3: for $\iota = 1, 2, ...,$ do
4: {These updates can be parallelized}
5: for $g = 1, ..., G$ do
6: Compute $\tilde{d}_g^{[\iota-1]}(t)$ via $$[\tilde{d}_g^{[\iota-1]}(t)]_f = \begin{cases} -\breve{P}_{g,f}^f \tilde{r}_f^{[\iota-1]}(t) + \Delta\omega_{f,g}^{[\iota-1]}, & f = 1, ..., F \\ -\breve{P}_{g+G,f} \tilde{r}_f^{[\iota-1]}(t) + \Delta\omega_{f,g+G,f}^{[\iota-1]}, & F+1, ..., 2F \end{cases}$$

where $$\tilde{r}_f^{[\iota-1]}(t) := \breve{y}_f(t) - \breve{P}_f \omega_f^{[\iota-1]}$$

$$\Delta\omega_{f,g}^{[\iota-1]} := \lambda(\omega_{f,g}^{[\iota-1]} - \breve{S}_{f,g}(t-1))$$

7: Compute $\tilde{w}_g^{[\iota-1]}(t)$ via $$\tilde{w}_g^{[\iota-1]}(t) := \tilde{\nu}_g^{[\iota-1]} - (1/L_h) \tilde{d}_g^{[\iota-1]}(t).$$

where $\tilde{\nu}_g^{[\iota-1]}$ comprises the $g$-th and the $(g+G)$-th rows of $\Omega^{[\iota]}$.

8: Update $\tilde{\nu}_g^{[\iota]}(t)$ via $$\tilde{\nu}_g^{[\iota]}(t) = \tilde{w}_g^{[\iota-1]}(t) \left(1 - \frac{\mu}{L_h \|\tilde{w}_g^{[\iota-1]}(t)\|_2}\right)_+.$$

9: end for
10: Compute $\zeta^{[\iota+1]} = \left(1 + \sqrt{1 + 4(\zeta^{[\iota]})^2}\right)/2.$
11: Update $\Omega^{[\iota+1]}$ as $$\Omega^{[\iota+1]} = \breve{S}^{[\iota]} + \left(\frac{\zeta^{[\iota]} - 1}{\zeta^{[\iota+1]}}\right)\left(\breve{S}^{[\iota]} - \breve{S}^{[\iota]}\right).$$

12: end for

*FIG. 10*

SPARSITY-DRIVEN PASSIVE TRACKING OF ACOUSTIC SOURCES

CROSS-REFERENCE TO RELATED APPLICATIONS

This application is a continuation-in-part of commonly-assigned U.S. patent application Ser. No. 14/285,400, entitled "Multitask Learning Method for Broadband Source-Location Mapping of Acoustic Sources" now U.S. Pat. No. 9,264,809, the content of which is fully incorporated by reference herein.

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 103844.

BACKGROUND

Tracking acoustic sources via passive sonar is a challenging task common to several underwater monitoring and surveillance systems. Classical tracking approaches based on matched-field tracking and Kalman filtering techniques are impractical due to their large computational and storage requirements.

BRIEF DESCRIPTION OF THE DRAWINGS

FIG. 10 shows a diagram of an accelerated version of the PG algorithm shown in FIG. 9.

DETAILED DESCRIPTION OF SOME EMBODIMENTS

Figure 1:
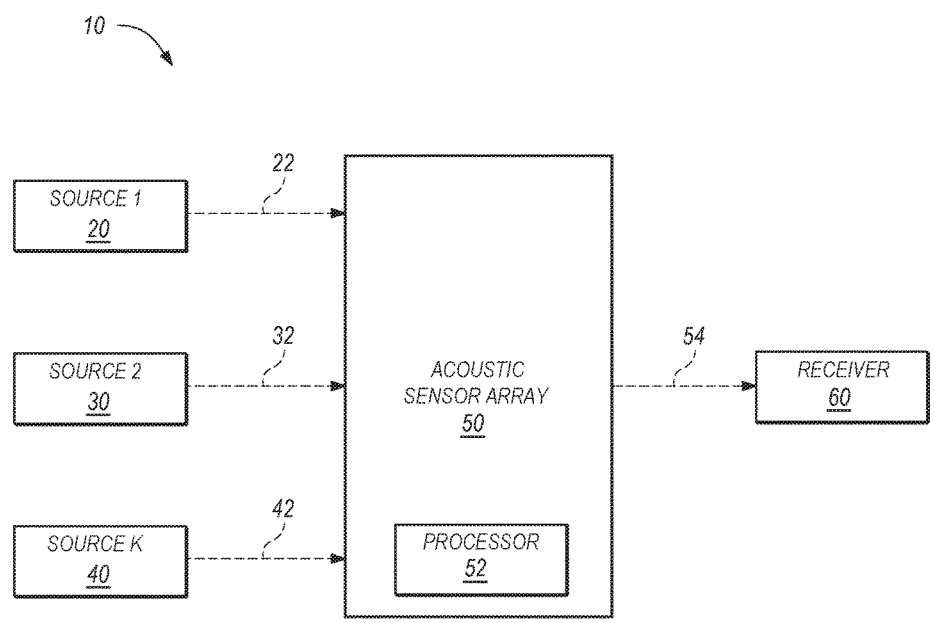
FIG. 1 shows a block diagram of an embodiment of a system in accordance with the Sparsity-Driven Passive Tracking of Acoustic Sources.

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The embodiments disclosed herein involve a sparsity-driven approach for tracking broadband acoustic sources. Source location maps (SLMs), one per frequency, are sequentially estimated while capturing the temporal dependence between successive SLMs. Coherence across the SLMs' support is enforced to guarantee that the source-location estimates are independent of frequency. An iterative solver based on the proximal gradient (PG) method may be used to construct the SLMs.

Localization and tracking of acoustic sources, such as in the underwater environment, is an important task for applications such as environmental monitoring and surveillance. Passive sonar enables monitoring and surveillance systems to operate without radiating sound into the water; hence, it is often employed in applications where concealment and low environmental impact are desired.

Underwater source localization via passive sonar is, nevertheless, difficult due to the complex interactions that sound undertakes as it propagates underwater. In shallow-water propagation environments, multi-path propagation leads to constructive and destructive acoustic interactions at the hydrophones that further exacerbate the localization problem. However, it is the same multi-path propagation that creates enough diversity in the set of received acoustic signals at the hydrophone array to enable localization in range, depth, and azimuth.

Acoustic data collected over time can be used for sketching source tracks by, for example, plotting source-location estimates over time. Tracking capitalizes on the temporal structure inherent to source tracks, which are always constrained by the kinematic features of the source, to improve source-location estimates. However, using classical tracking methods, such as Kalman filtering, to develop a passive acoustic tracker poses significant computational challenges.

Matched-field processing (MFP) refers to classical underwater source-localization techniques that rely on an acoustic model for characterizing the acoustic propagation in the environment. It uses the adopted model to predict acoustic pressures, also known as replicas, at the hydrophones for sources located on a grid of tentative source locations. Then, it "matches" the replicas to the acoustic measurements gathered by the array in order to obtain acoustic-power estimates at all grid locations. The resulting power estimates are subsumed within the so-called ambiguity surface (or ambiguity volume if the sources' azimuths are also unknown). Source localization, thus, becomes a peak-picking problem where source-location estimates are mapped to grid points having high acoustic-power estimates. Despite the merits of MFP, the quality of its location estimates continues to be challenged by the presence of multiple sources and mismatch between the true propagation environment and the acoustic model used. These challenges can cause artifacts on the ambiguity surfaces that conceal the true source locations.

Tracking of underwater acoustic sources using passive sonar has traditionally been relegated to a post-processing task under the name of matched-field tracking (MFT). MFT algorithms construct a sequence of ambiguity surfaces to enable source localization at each point of the acoustic sources' trajectories.

Tracks are obtained by knitting peaks of consecutive ambiguity surfaces together. A directed graph constructed by connecting the largest peaks on neighboring ambiguity surfaces is used to construct the family of allowed tracks. The number of tracks grows combinatorially with the number of peaks used, quickly rendering this approach as computationally intractable.

Assumptions on the kinematics of the acoustic sources, e.g., maximum source velocity, constant source-speed and constant depth-trajectories, are used to reduce the number of tracks to be considered. The surviving tracks are scored based on their average acoustic-power estimates. When tracking a single source, the track with the largest score is chosen to be the true trajectory. This approach has been extended to enable coherent processing of broadband data. Weighted approaches for scoring the tracks obtained from the graph have also been proposed. A limitation common to all these approaches is that they do not use prior information when generating the ambiguity surfaces. Thus, these approaches are not well suited to process data in real time since they are required to construct a batch of ambiguity surfaces for generating tracks.

More recently, Bayesian approaches for joint tracking and parameter inversion in the context of underwater source localization have been proposed. Due to the nonlinear relationship between source locations and replicas, they use computationally-taxing Markov Chain Monte Carlo methods for estimating posterior probability distributions and are, thus, prohibited in the context of real-time underwater tracking.

Sparsity-driven Kalman-filter approaches can be used for tracking acoustic sources over a grid. These approaches use the entire localization grid postulated in MFP to define their state variable. They presume that only those grid entries corresponding to the locations of the sources take non-zero values. Hence, the state variable has a sparse structure. Direct application of these methods for underwater source localization is impractical due to the high dimensionality of the grid, and hence that of the state variable. Bayesian methods for tracking a sparse signal that build on the relevance vector machine have also been proposed. However, their associated computational cost is also high due to the size of their state-space variable and their need to maintain a covariance-matrix estimate for it.

The embodiments discussed herein relate to a sparsity-driven framework for broadband source localization via passive sonar. Per time instant, SLMs, one per frequency, are constructed. Only those points on the map that correspond to source locations take nonzero values. All other points in the SLMs are set to zero. Motivated by the fact that the source locations are presumed to be independent of frequency, coherence across SLMs is enforced to guarantee that their support coincides. SLMs can be combined to construct a broadband SLM. Different from previous approaches to construct SLMs, the disclosed approach considers a regularizer that forces the SLM estimator to use both the previous SLM obtained and the new measurement available. An iterative solver based on PG may be used for constructing the SLMs.

FIG. 1 shows a block diagram of an embodiment of the operational concept of a system 10 in accordance with the Sparsity-Driven Passive Tracking of Acoustic Sources. System 10 includes K acoustic sources 20, 30, and 40, each radiating sound underwater. Although the acoustic sources are presumed to be mobile, thus justifying the dependence of their locations $\{r_k(\tau)\}_{k=1}^{K}$, on the time $\tau \in \mathbb{N}$, no assumptions about their kinematics are made. Each $r_k(\tau) \in \mathbb{R}^d$ is given in cylindrical coordinates comprising the source's range, depth (with respect to the sea surface), and azimuth, with $d \in \{1,2,3\}$.

An acoustic sensor array 50 detects acoustic signals 22, 32, and 42 from sources 20, 30, and 40, respectively. As an example, an acoustic sensor array 50 is an array of N hydrophones with known and arbitrary geometry, where N>0. Array 50 is used to collect a time series of acoustic pressure vectors $\{y(\tau) \in \mathbb{R}^N : \tau \in \mathbb{N}\}$ with entries $[y(\tau)]_n \in \mathbb{R}$ denoting the acoustic pressure measured by the n-th hydrophone in the array at time τ. Note that although the framework is agnostic to the specific geometry of the array, its geometry affects the definition of source location. For instance, data gathered with an array that features horizontal aperture but no vertical aperture primarily provides information about the sources' azimuth only (d=1), although source range and depth can be determined depending on the closeness of the source to the end fire direction, the length of the array, and the bandwidth considered. On the other hand, data collected on a vertical array with no horizontal aperture provide information on the source range and depth only (d=2), unless the bathymetry is not flat. Data gathered with an array featuring vertical and horizontal aperture provides information about the sources' range, depth, and azimuth (d=3).

The acoustic time-series data is transformed to the frequency domain via a discrete-time Fourier transform. Fourier coefficients at F frequencies $\{\omega_f\}_{f=1}^{F}$ across the N hydrophones are collected per frequency to vectors $y_f(t) := [y_f^1(t), \ldots, y_f^N(t)]' \in \mathbb{C}^N$, where $y_f^N(t)$ denotes the Fourier coefficient estimate corresponding to $\omega_f$ at time t obtained from data gathered by the n-th hydrophone and ' denotes the transpose operator.

It is presumed that a model characterizing the acoustic propagation in the environment is available. If $\{r_k(t) \in \mathbb{R}^d\}_{k=1}^{K}$ were known, one could use it to compute model-predicted Fourier coefficients at the array for each source location, i.e., replicas. Let $\check{p}_{k,f}$ denote the normalized replica for a source located at $r_k(t)$ transmitting at $\omega_f$, where the normalization implies that $\|\check{p}_{k,f}\|_2$. Each $y_f(t)$ can be modeled as $$y_f(t) = \Sigma_{k=1}^{K} s_{k,f}(t) \check{p}_{k,f} + \epsilon_f(t), f=1, \ldots F \quad \text{(Eq. 1)}$$

where $\epsilon_f(t) \in \mathbb{C}^N$ denotes a zero-mean additive noise component, and $s_{k,f}$ denotes the Fourier coefficient at $\omega_f$ of the acoustic signature of the spectrum corresponding to the k-th source acoustic signature at time t. The replicas $\check{p}_{k,f}$'s are obtained using a model that characterizes the acoustic propagation environment and the geometry of the array. Although replicas have been defined as time invariant, (Eq. 1) can be adapted to capture spatiotemporal changes in the model used to generate the replicas.

Given K and $\{y_f(t), \forall f\}_{\tau=0}^{t}$, the goal of the spectral passive-acoustic tracking problem is to recursively estimate the locations $\{r_k(t)\}_{k=1}^{K}$ of the acoustic sources 20, 30, and 40. Even if all $s_{k,f}(t)$ in (Eq. 1) were known, finding estimates for the source locations is difficult due to the non-linear relationship between $r_k(t)$ and $\check{p}_{k,f}$, which in most cases of interest is not available in closed form.

In some embodiments, the estimation of the locations of the acoustic sources is performed by a processor 52 embedded within acoustic sensor array 50, with the results being transmitted, via signal 54, to receiver 60. In some embodiments, acoustic sensor array sends, via signal 54, the signal measurements to receiver 60, which performs the required processing.

Figure 2:
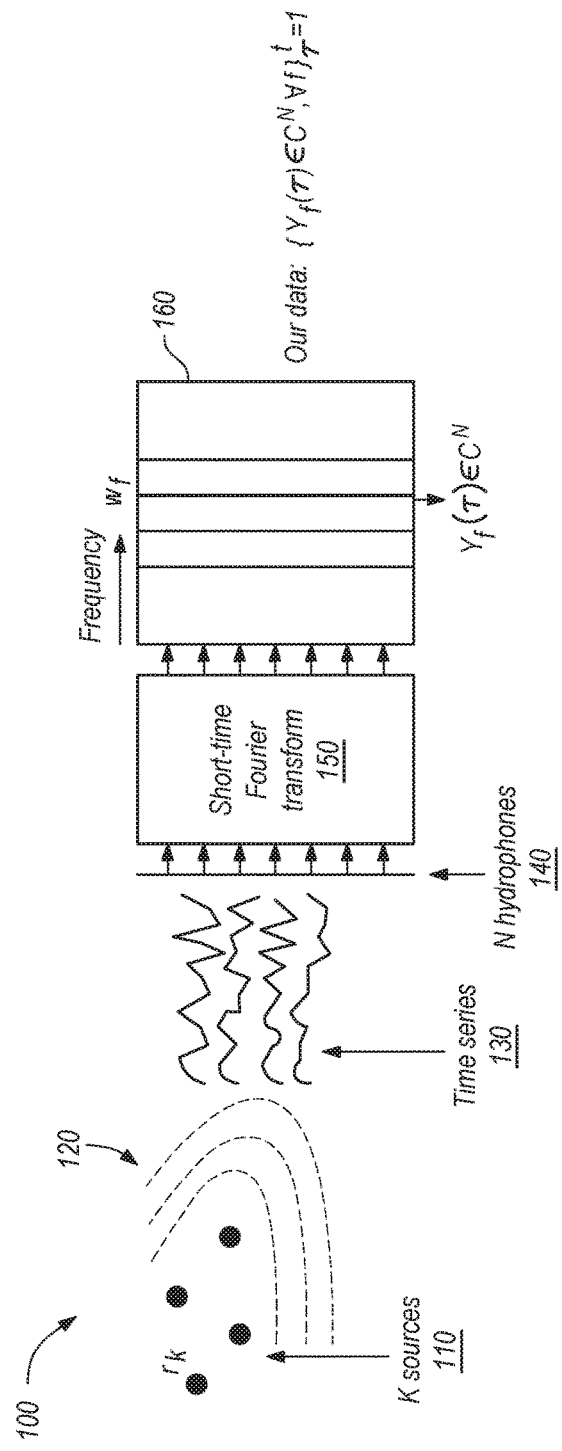
FIG. 2 shows a diagram of an embodiment of a data collection model used in accordance with the Sparsity-Driven Passive Tracking of Acoustic Sources.

As shown in diagram 100 of FIG. 2, acoustic sources 110 generate acoustic signals 120 that propagate through the propagation environment towards an acoustic sensor array 140, which in this case is a hydrophone array. Acoustic signals are collected by the hydrophone array 140 as a time series 130 of acoustic pressures. The time-series data captured by each hydrophone in array 140 is transformed to the Fourier domain via a short-time Fourier transform (STFT) processing step 150 yielding Fourier coefficients. The Fourier coefficients obtained across hydrophones for a set of F frequencies $\{\omega_1, \ldots, \omega_F\}$ are grouped to construct Fourier coefficient vectors $y_f(t) \in \mathbb{C}^N$ at the end of processing step 160.

Figure 3:
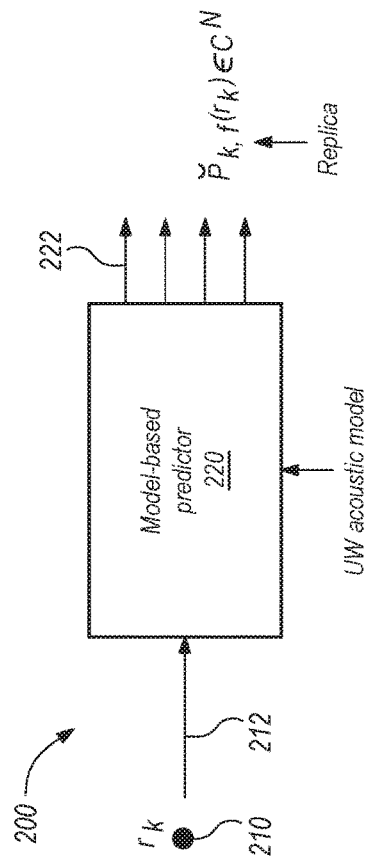
FIG. 3 shows a flowchart of an embodiment of a replica generation model in accordance with the Sparsity-Driven Passive Tracking of Acoustic Sources.

Referring to FIG. 3, diagram 200 shows an embodiment of a model-based prediction component, where a postulated source location 210 is input 212 into a model-based predictor 220. Based upon an acoustic model, such as an underwater acoustic model characterizing the true propagation environment, predictor 220 yields a replica vector 222. Replicas are model-based predicted vectors of Fourier coefficients that are used by the Passive Tracking of Acoustic Sources with Sparse Innovations to model the $y_f(t)$'s and determine the source localizations.

Figure 4:
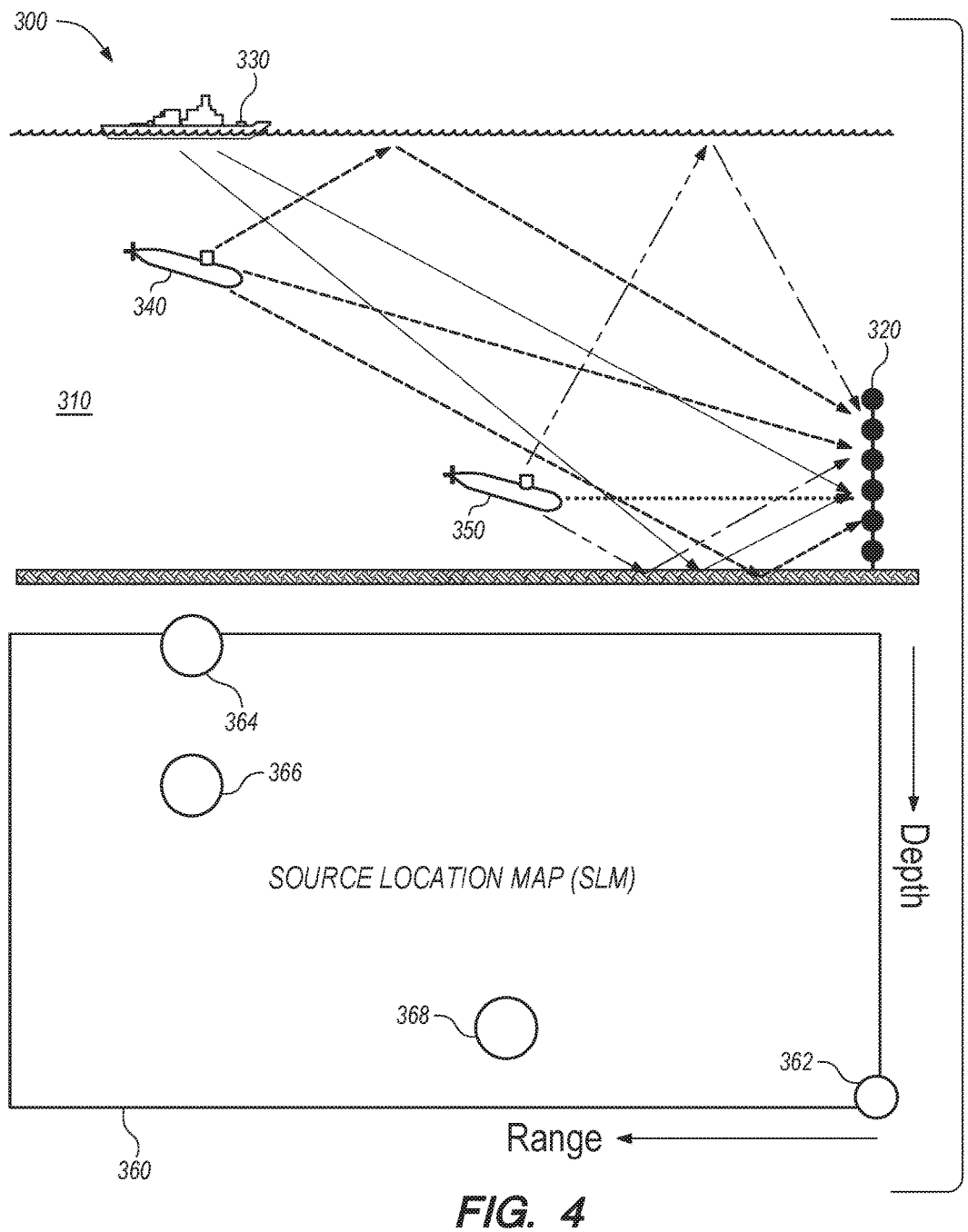
FIG. 4 shows a diagram illustrating an example of an operational environment and corresponding Source Location Map (SLM).

FIG. 4 shows a diagram 300 illustrating an example of an operational environment and the desired SLM. As shown, an underwater environment 310 includes a sensor array 320 mounted to the seafloor, a ship 330 on the surface of the water, and submarines 340 and 350 located underwater. An SLM 360 includes a marker 362 representing the location of sensor array 320, a marker 364 representing the estimated location of ship 330, a marker 366 representing the estimated location of submarine 340, and a marker 368 representing the estimated location of submarine 350.

A model that alleviates the challenges associated with the nonlinearities inherent to (Eq. 1) is proposed next. A possible approach is to introduce a grid of tentative source locations $\mathcal{G} := \{r_g\}_{g=1}^{G}$ with $G \gg \max\{KF, N\}$. Now the $y_f(t)$'s at time t can be modeled as $$y_f(t) = \Sigma_{g=1}^{G} s_{g,f}(t) p_{g,f} + \epsilon_f(t), f=1, \ldots, F \quad \text{(Eq. 2)}$$

where $p_{g,f}$ denotes the normalized replica corresponding to a source located at $r_g \in \mathcal{G}$, and $s_{g,f}(t)$ the Fourier coefficient at $\omega_f$ of the spectrum corresponding to the acoustic signature of the source located at $r_g \in \mathcal{G}$ at time t.

Since $G \gg KF$ most of the $s_{g,f}(t)$'s are expected to be zero. Only those few $s_{g,f}(t)$'s that correspond to the true source locations should take non-zero values. Let $s_f(t) := [s_{1,f}(t), \ldots, s_{G,f}(t)]' \in \mathbb{C}^G$ and $S(t) := [s_1(t), \ldots, s_F(t)] \in \mathbb{C}^{G \times F}$. Once an estimate for S(t) is available, a broadband SLM can be obtained by plotting the pairs $(r_g, \|\varsigma_g(t)\|_2)$ for all $r_g \in \mathcal{G}$, where $\varsigma_g(t) := [s_{g,1}(t), \ldots, s_{g,F}(t)]' \in \mathbb{C}^F$ comprises the entries of the g-th row of S(t). Source location estimates $\{\hat{r}_k(t)\}$ correspond to the location of the K-largest peaks in the broadband SLM, that is $$\mathcal{K} \in \operatorname*{argmax}_{|\mathcal{K}|=K} \Sigma_{k \in \mathcal{K}} \|\varsigma_k\|_q \quad \text{(Eq. 3)}$$

Discussed below is an estimator for S(t) that captures the group sparsity inherent to the rows of S(t) and the temporal dependency between SLMs corresponding to consecutive time instances.

An iterative estimator for S(t) is proposed that uses the previously estimated S(t−1) to capture the temporal dependency between source locations at consecutive time instances. Per time t, an estimate $\hat{S}(t) = [\hat{s}_1(t), \ldots, \hat{s}_F(t)]$ for S(t) is obtained as $$\hat{S}(t) = \operatorname*{argmin}_{S \in \mathbb{C}^{G \times F}} \frac{1}{2} \sum_{f=1}^{F} \|y_f(t) - P_f s_f\|_2^2 + \quad \text{(Eq. 4)}$$

$$\frac{\lambda}{2} \sum_{f=1}^{F} \|s_f - \hat{s}_f(t-1)\|_2^2 + \mu \sum_{g=1}^{G} \|\varsigma_g\|_2$$

where $S:=[s_1, \ldots, s_F]$, $\varsigma_g'$ is the g-th row of S, $P_f:=[p_{1,f}, \ldots, p_{G,f}] \in \mathbb{C}^{N \times G}$ is the matrix of replicas for $\omega_f$, and $\mu, \lambda > 0$ are tuning parameters. Equation (Eq. 4) represents a regularized least-squares regression problem. The regularization term in (Eq. 4) scaled by $\mu$ encourages group sparsity on the rows of $\hat{S}(t)$, with $\mu$ controlling the number of non-zero rows in $\hat{S}(t)$. The regularization term scaled by $\lambda$ encourages estimates $\hat{s}_f(t)$ to be close to $\hat{s}_f(t-1)$, $\forall f$, with $\lambda$ controlling the emphasis place on $\hat{s}_f(t-1)$ when estimating $s_f(t)$, $\forall f$.

Figure 5:
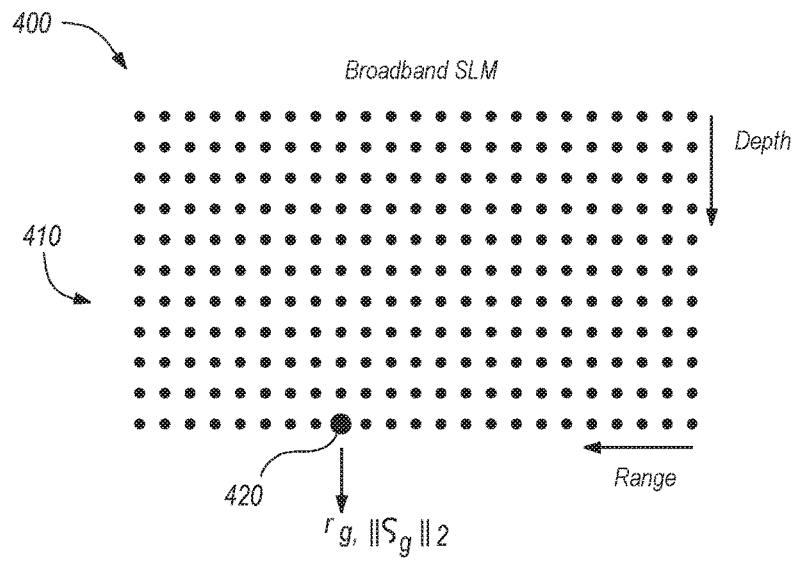
FIG. 5 shows a diagram of a grid that can be used to construct a broadband source localization map.

FIG. 5 shows a diagram 400 of an embodiment of a grid 410 comprising a plurality of tentative locations, which can be used to construct an SLM, and an estimated source location 420. Location 420 corresponds to a point $(r_g, \|\varsigma_g\|_q)$. Although only one estimated source location 420 is shown for SLM 410, other SLMs may contain additional estimated source locations 420.

Figure 6:
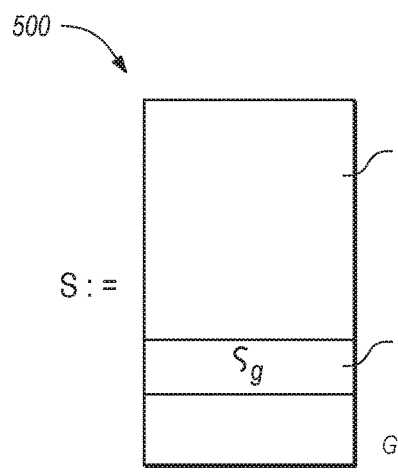
FIG. 6 shows a diagram of the structure of the regression coefficient matrix S.

FIG. 6 shows a diagram 500 of the structure of the regression coefficient matrix S 510. Once an estimate for S has been obtained, its columns can be used to construct SLMs over $\mathcal{G}$ per $\omega_f$. Furthermore, a broadband SLM can be constructed using whole rows of S for each $r_g \in \mathcal{G}$. For instance, after defining $\varsigma_g := [s_{g,1}, \ldots, s_{g,F}]' \in \mathbb{C}^F$ as the vector corresponding to the g-th row of S 520, an SLM can be constructed by plotting the pairs $(r_g, \|\varsigma_g\|_q)$ for all $r_g \in \mathcal{G}$ and $q > 1$.

Equation 4 may be written as a real-valued convex optimization problem after representing all complex-valued variables by the direct sum of their real and imaginary parts. To this end, the following notation is introduced: $\breve{y}_f(t) := [\operatorname{Re}\{y_f(t)\}', \operatorname{Im}\{y_f(t)\}']'$, $\breve{s}_f := [\operatorname{Re}\{s_f\}', \operatorname{Im}\{s_f\}']'$, $\breve{S} := [\breve{s}_1, \ldots, \breve{s}_F]$, and $$\breve{P}_f := \begin{bmatrix} \operatorname{Re}\{P_f\} & -\operatorname{Im}\{P_f\} \\ \operatorname{Im}\{P_f\} & \operatorname{Re}\{P_f\} \end{bmatrix} \quad (\text{Eq. 5})$$

where $\operatorname{Re}\{\bullet\}$ ($\operatorname{Im}\{\bullet\}$) denotes the real-part (imaginary-part) operator. Matrix $\breve{S}$ can be alternatively viewed in terms of its rows as $\breve{S} = [\mathcal{G}_1', \ldots, \mathcal{G}_{2G}']'$ where the first (last) G rows correspond to the real (imaginary) parts of the rows of S.

Figure 7:
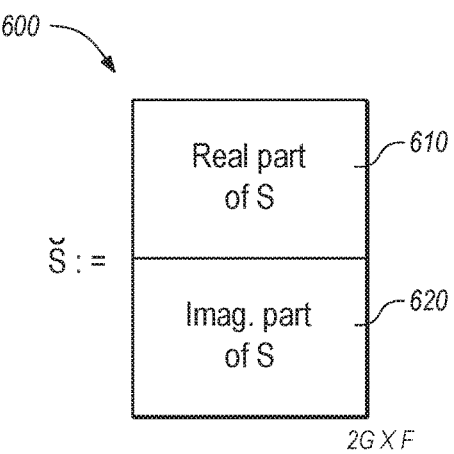
FIG. 7 shows a diagram illustrating the structure of the real-valued matrix Š, which comprises the real and imaginary parts of the complex-valued matrix S as two different blocks.

Equation (Eq. 4) is equivalent to the following convex optimization problem:

$$\breve{S}(t) = \underset{\breve{s} \in \mathbb{R}^{2G \times F}}{\operatorname{argmin}} \frac{1}{2} \sum_{f=1}^{F} \left\| \breve{y}_f(t) - \breve{P}_f \breve{s}_f \right\|_2^2 + \quad (\text{Eq. 6})$$
$$\frac{\lambda}{2} \sum_{g=1}^{G} \left\| \breve{v}_g - \breve{v}_g(t-1) \right\|_2^2 + \mu \sum_{g=1}^{G} \left\| \breve{v}_g \right\|_2$$

where $\breve{v}_g := [\mathcal{G}_1', \ldots, \mathcal{G}_{2G}']' \in \mathbb{R}^{2F}$, $\breve{v}_g(t-1)$ corresponds to the direct sum of the real and imaginary parts of $\varsigma_g(\varsigma_g(t-1))$. FIG. 7 shows a diagram 600 illustrating the structure of $\breve{S}$. It comprises two blocks that correspond to the real part 610 of matrix S and the imaginary part 620 of matrix S. Note that the minimizer $\hat{S}(t)$ of (Eq. 4) can be obtained as a function of $\breve{S}(t)$ as $\hat{S}(t) = \breve{S}_{1:G}(t) + j\breve{S}_{G+1:2G}(t)$, where $j := \sqrt{-1}$ and $\breve{S}_{g_1:g_2}(t)$ is a matrix which comprises rows $g_1$ to $g_2$ from $\breve{S}(t)$, $1 \leq g_1 \leq g_2 \leq G$.

Although (Eq. 6) is a convex optimization problem that can be solved via interior point methods, such a solver would entail high computational complexity due to the high dimensionality of $\breve{S}$ and fail to exploit the sparse structure of $\breve{S}$. The ensuing section presents a PG solver for (Eq. 6) that capitalizes its structure to obtain closed-form updates.

Equation (Eq. 4) may also be written as $$\min_{\breve{S} \in \mathbb{R}^{2G \times F}} \frac{1}{2} \sum_{f=1}^{F} \left\| \breve{y}_f(t) - \breve{P}_f \breve{s}_f \right\|_2^2 + \quad (\text{Eq. 7})$$
$$\frac{\lambda}{2} \sum_{f=1}^{F} \left\| \breve{s}_f \right\|_2^2 - \lambda \sum_{g=1}^{G} \breve{v}_g' \breve{v}_g(t-1) + \mu \sum_{g=1}^{G} \left\| \breve{v}_g \right\|_2$$

where all terms independent of $\breve{S}$ have been removed from the cost. The terms $$\frac{\lambda}{2} \cdot \left\| \breve{s}_f \right\|_2^2,$$
$$f = 1,$$

in the regularizer are known to induce resilience to model mismatch into the estimate $\breve{S}(t)$. From this vantage point, $\lambda > 0$ corresponds to the variance of a random perturbation affecting each replica, which depends on the mismatch between the true propagation environment and the model used to generate the replicas. The linear terms $-\lambda \breve{v}_g' \breve{v}_g(t-1)$ encourage estimates $\breve{v}_g(t)$ to be close to $\breve{v}_g(t-1)$. In particular, as the model mismatch increases, and thus the reliability of the replicas decreases, (Eq. 7) naturally steers its attention towards the prior SLM estimates subsumed by the $\breve{v}_g(t-1)$'s.

A PG algorithm for solving (Eq. 6) that capitalizes on its sparse structure is discussed below. Equation 6 may be written as $\min_{\breve{s}} h(\breve{S}) + \mu \Sigma_{g=1}^{G} \|\breve{v}_g\|_2$, where $h(\breve{S}) := \frac{1}{2} \Sigma_{f=1}^{F} [\|\breve{y}_f(t) - \breve{P}_f \breve{s}_f\|_2^2 + \lambda \|\breve{s}_f\|_2^2 - 2\lambda \breve{s}_f' \breve{s}_f(t-1)]$ denotes the continuously-differentiable portion of the cost. Note that the gradient of $h(\breve{S})$ is Lipschitz continuous with Lipschitz constant $L_h := \max_{f=1, \ldots, F} \sigma_{max}(\breve{P}_f' \breve{P}_f + \lambda I_{2G})$, where $\sigma_{max}(\breve{P}_f' \breve{P}_f)$ denotes the largest singular value of $\breve{P}_f' \breve{P}_f$. That is, $\|\nabla h(\breve{S}_1) - \nabla h(\breve{S}_2)\|_2 \leq L_h \|\breve{S}_1 - \breve{S}_2\|_F$, where $\nabla h(\breve{S}_i)$ denotes the gradient of h with respect to $\breve{S}$ evaluated at $\breve{S}_i$. It should also be noted that $L_h$ can be obtained at a reduced computational cost by using the singular values of the $\breve{P}_f$'s as $$L_h = \max_f [\sigma_{max}(P_f)]^2 + \lambda.$$

Figures 8, 9:
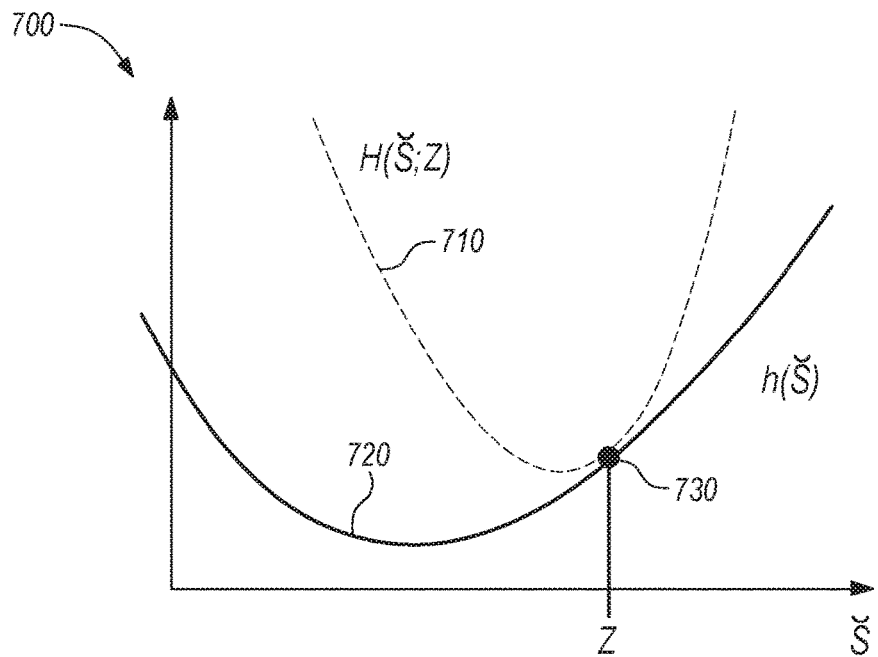
FIG. 8 shows a graph illustrating the concept of a majorizer used by the Proximal Gradient (PG) method.
FIG. 9 shows a diagram of a PG algorithm developed for estimating $S^m$.

The PG method can be interpreted as a majorization-minimization method relying on a majorizer $H(\breve{S}; Z)$ for h, where $Z := [z_1, \ldots, z_F] \in \mathbb{R}^{2G \times F}$ is an auxiliary matrix. The majorizer H satisfies: (i) $H(\breve{S}; Z) \geq h(\breve{S})$, $\forall(\breve{S})$; and, (ii) $H(\breve{S}; Z) = h(\breve{S})$ for $Z = \breve{S}$. The specific H used by the PG method is $$H(\breve{S}; Z) := h(Z) + \sum_{f=1}^{F} \nabla h_f(z_f)' (\breve{s}_f - z_f) + \frac{L_h}{2} \left\| \breve{S} - Z \right\|_F^2 \quad (\text{Eq. 8})$$

where $h_f(\breve{s}_f) := \frac{1}{2} \|\breve{y}_f(t) - \breve{P}_f \breve{s}_f\|_2^2 + \lambda \|\breve{s}_f\|_2^2 - 2\lambda \breve{s}_f' \breve{s}_f(t-1)$, and $\nabla h_f(z_f)$ denotes the gradient of $h_f$ with respect to $\breve{s}_f$ evaluated at $z_f$. That the majorizer in (Eq. 7) satisfies conditions (i) follows from the fact that the gradient of h is Lipschitz continuous, and that it satisfies (ii) follows after setting $Z = \breve{S}$ in (Eq. 8). FIG. 8 shows a graph 700 illustrating a majorizer H 710 for the smooth function h 720. Note that the line intersection 730 illustrates condition (ii) above, that is, H must touch at the point $Z = \breve{S}$. With i denoting the PG iteration index, the PG algorithm iteratively solves $$\check{S}^i(t) = \min_{\check{S}} \left[ H(\check{S}; \check{S}^{(i-1)}(t)) + \mu \sum_{g=1}^{G} \|\check{v}_g\|_2 \right] \quad \text{(Eq. 9)}$$

where $\check{S}^i(t)$ denotes the PG estimate for $\check{S}(t)$ at iteration i.

From an algorithmic point of view, it is convenient to write H as a function of the $\check{v}_g$'s. After performing some algebraic manipulations on H and dropping all terms independent of $\check{S}$, (Eq. 9) can be written as $$\check{S}^{[i]}(t) = \min_{\check{S}} \sum_{g=1}^{G} \left( \frac{L_h}{2} \|\check{v}_g - w_g^{[i-1]}(t)\|_2^2 + \mu \|\check{v}_g\|_2 \right) \quad \text{(Eq. 10)}$$

where $$w_g^{[i-1]}(t) := \check{v}_g^{[i-1]}(t) - \left(\frac{1}{L_h}\right) d_g^{[i-1]}(t) \quad \text{(Eq. 11)}$$

is a gradient-descent step, with step-size $$\frac{1}{L_h},$$

for the g-th row of $\check{S}$, and the entries of $d_g^{[i-1]}(t)$, which correspond to those of the gradient of $h_f$ with respect to $\check{v}_g$, are $$[d_g^{[i-1]}(t)]_f = \quad \text{(Eq. 12)}$$
$$\begin{cases} -\check{p}'_{g,f} r_f^{[i-1]}(t) + \Delta s_{f,g}^{[i-1]}(t), & f = 1, \ldots, F \\ -\check{p}'_{g+G,f} r_f^{[i-1]}(t) + \Delta s_{f,g+G}^{[i-1]}(t), & f = F+1, \ldots, 2F \end{cases}$$

where $r_f^{[i-1]}(t) := \check{y}_f(t) - \check{P}_f \check{s}^{[i-1]}(t)$ and $\Delta s_{f,g+G}^{[i-1]}(t) := \lambda(\check{s}_{f,g}^{[i-1]}(t) - s_{f,g}(t-1))$. Equation (Eq. 9) is often called the proximal operator $\mu \|\check{v}_g\|_2$ with parameter $$\frac{1}{L_h}.$$

Equation (Eq. 9) is decomposable across $\check{v}_g$'s. Per iteration i, the PG update in (Eq. 8) can be performed in parallel for every pair of rows of $\check{S}$ comprised in each $\check{v}_g$ via $$\check{v}_g^i(t) = \min_{\check{v}_g} \frac{L_h}{2} \|\check{v}_g - w_g^{[i-1]}(t)\|_2^2 + \mu \|\check{v}_g\|_2. \quad \text{(Eq. 13)}$$

The cost in (Eq. 13) is convex; however, it is non-differentiable due to $\|\check{v}_g\|_2$. Despite the non-differentiability of its cost, (Eq. 13) can be solved in closed form and its solution in this case is $$\check{v}_g^i(t) = w_g^{[i-1]}(t) \left(1 - \frac{\mu}{L_h \|w_g^{[i-1]}(t)\|_2}\right)_+ \quad \text{(Eq. 14)}$$

where $(\bullet)_+ = \max\{0, \bullet\}$. Equation (Eq. 14) follows readily from the Karush-Kuhn-Tucker (KKT) conditions for (Eq. 13) where the notion of sub-differential is used to characterize $\check{v}_g^{[i]}(t)$.

The resulting PG algorithm is summarized as Algorithm 1 shown in diagram 800 of FIG. 9. Per iteration, the PG update entails O (NGF) scalar operations required for computing $d_g^{[i-1]}(t)$ in (Eq. 11). The algorithm terminates when $\|\check{S}^{[i]}(t) - \check{S}^{[i-1]}(t)\|_2 / \|\check{S}^{[i]}(t)\|_2 \le \epsilon_s$, where $\|\bullet\|$ denotes the Frobenius norm and $\epsilon_s$ is a small positive threshold, e.g., $\epsilon_s = 10^{-5}$. Algorithm 1 can be shown to converge to the solution of (Eq. 5) while featuring a worst-case convergence rate of O(1/i). Thus its convergence may be slow in practice, requiring up to several hundreds of iterations to achieve a highly accurate solution. Nevertheless, it has been observed that the support of $\check{S}^{[i]}(t)$ can be correctly identified using fewer iterations (in the order of 50 iterations). Moreover, it is possible to develop an accelerated version of Algorithm 1 featuring a worst-case convergence rate of $$O\left(\frac{1}{i^2}\right).$$

The updates involved in the resulting accelerated PG algorithm are outlined in diagram 900 shown in FIG. 10.

Figure 11:
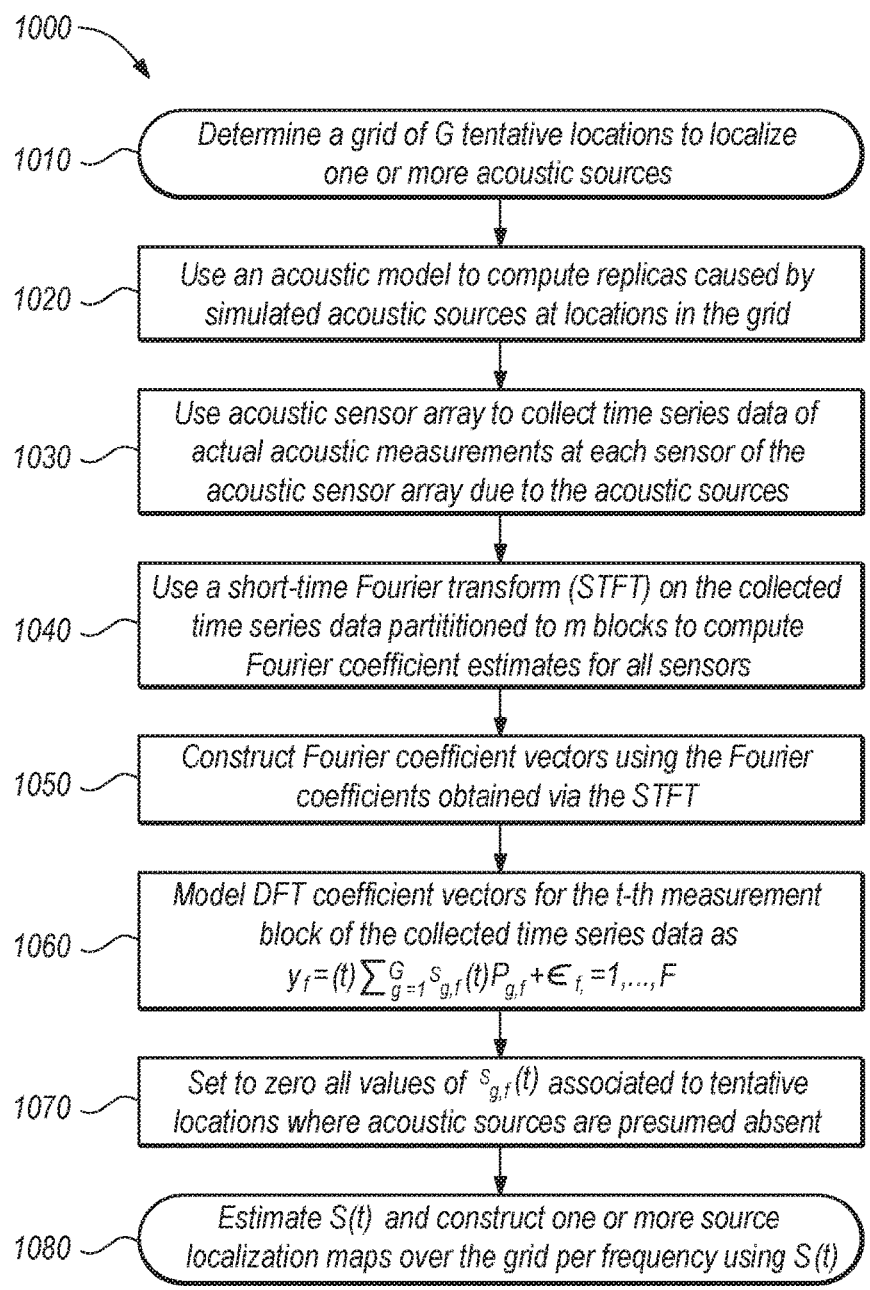
FIG. 11 shows a flowchart of an embodiment of a method in accordance with the Passive Tracking of Acoustic Sources with Sparse Innovations.

FIG. 11 shows a flowchart of an embodiment of a method 1000 in accordance with the Passive Tracking of Underwater Acoustic Sources with Sparse Innovations. As an example, method 1000 may be performed by system 10, 100, and 200 as shown in FIGS. 1-3. Also, while FIG. 11 shows one embodiment of method 1000 to include steps 1010-1080, other embodiments of method 1000 may contain fewer or more steps. Further, while in some embodiments the steps of method 1000 may be performed as shown in FIG. 11, in other embodiments the steps may be performed in a different order, or certain steps may occur simultaneously with one or more other steps. Additionally, some or all of the steps of method 1000 may be performed by processor 52 embedded within acoustic sensor array 50, by receiver 60, or by other processing means operatively connected to acoustic sensor array 50.

Method 1000 may begin with step 1010, which involves defining a grid $\mathcal{G}$ of G tentative locations $r_g$, to localize more than one acoustic sources, based on the location of an acoustic sensor array 50, where up to K acoustic sources 20, 30, and 40 are presumed to be located. In some embodiments step 1010 includes the step of estimating the number of acoustic sources, while in other embodiments the number of acoustic sources is predetermined.

Step 1020 involves using an acoustic model to compute, via the model-based predictor 220, replicas that correspond to simulated acoustic sources at locations in $\mathcal{G}$, wherein the replicas are model-predicted Fourier coefficient vectors at F frequencies $\{\omega_f\}_{f=1}^F$ corresponding to the acoustic pressure field 120 as sampled by an acoustic sensor array 140 having N sensors. Step 1030 involves collecting, using acoustic sensor array 140, time series data 130 of actual acoustic measurements at each sensor of the acoustic sensor array caused by the acoustic sources 110.

Method 1000 may proceed to step 1040, which involves using a short-time Fourier transform (STFT) 150 on the collected time-series data 130 partitioned to m blocks to compute Fourier coefficient estimates at frequencies $\{\omega_f\}_{f=1}^F$ for all N sensors. Step 1050 involves constructing a set of Fourier coefficient vectors $Y(t) := [y_1(t), \ldots, y_F(t)] \in$ $\mathbb{C}^{N \times F}$, where $[Y(t)]_{n,f} \in \mathbb{C}$ denotes the Fourier coefficient corresponding to $\omega_f$ for the n-th sensor in the t-th STFT block, at step 160 using the Fourier coefficients previously obtained via the STFT.

Step 1060 involves modeling Fourier coefficient vectors at $\omega_f$ for the m-th measurement block of the collected time series data as $y_f(t)=\Sigma_{g=1}^{G} s_{g,f}(t) p_{g,f} + \epsilon_f(t)$, $\forall f$, where $s_{g,f}(t)$ denotes the unknown Fourier coefficient associated to the acoustic signature at frequency $\omega_f$ for a source located at $r_g$, $p_{g,f} \in \mathbb{C}^N$ is the replica for $\omega_f$ corresponding to a source located at $r_g$ normalized so that $\|p_{g,f}\|_2 = 1$, and $\epsilon_f(t)$ denotes the Fourier coefficients at $\omega_f$ corresponding to the noise in the t-th block.

Step 1070 involves setting to zero all values of $s_{g,f}(t)$ associated to tentative locations $r_g$ where acoustic sources are presumed to be absent. Step 1070 is an optional step that may or may not appear in all embodiments of the methods disclosed herein. It relays on so-called predictor screening rules that can identify with certainty points in $\mathcal{G}$ where acoustic sources are absent. A specific embodiment of a predictor-screening rule is described in the commonly-assigned U.S. patent application Ser. No. 14/285,400, entitled "Multitask Learning Method for Broadband Source-Location Mapping of Acoustic Sources."

Step 1080 involves obtaining, at time t an estimate S(t) as the solution to $$\min_{S \in \mathbb{C}^{G \times F}} \frac{1}{2} \sum_{f=1}^{F} \|y_F(t) - P_f s_f\|_2^2 + \frac{\lambda}{2} \sum_{f=1}^{F} \|s_g - \hat{s}_g(t-1)\|_2^2 + \mu \sum_{g=1}^{G} \|\varsigma_g\|_2,$$

where $S := [s_1, \ldots, s_F] \in \mathbb{C}^{G \times F}$, $\varsigma_g'$ is the g-th row of S, $P_f := [p_{1,f}, \ldots, p_{G,f}] \in \mathbb{C}^{N \times G}$ is the matrix of replicas for $\omega_f$, and $\mu, \lambda > 0$ are tuning parameters. Step 1080 also involves generating one or more SLMs over $\mathcal{G}$ per frequency $\omega_f$ using S(t), wherein each location on a particular SLM is associated with the magnitude of its corresponding acoustic gain estimate $|\hat{s}_{g,f}(t)|$, wherein estimates of the actual locations of the K acoustic sources, $\{\hat{r}_k(t)\}_{k \in \kappa}$, correspond to the locations of the K-largest coefficients $|\hat{s}_{g,f}(t)|$ depicted in the SLM. In some embodiments of step 1080, the SLMs are generated using an iterative problem solver based upon the PG method.

In some embodiments, step 1080 involves generating SLMs over $\mathcal{G}$ per frequency $\omega_f$ using each column $s_f(t)$ of S(t) to construct the SLMs per frequency $\omega_f$. In some embodiments, step 1080 involves generating a broadband SLM over $\mathcal{G}$ comprising all frequencies $\omega_f$ used to compute S(t) using a whole row of S(t) for each $r_g \in \mathcal{G}$. In some embodiments of step 1080, generating SLMs over $\mathcal{G}$ per frequency $\omega_f$ involves generating a broadband SLM over $\mathcal{G}$ using S(t) by plotting the pairs $(r_g, \|\varsigma_g(t)\|_2)$ for all $r_g \in \mathcal{G}$, where $\varsigma_g(t) := [s_{g,1}(t), \ldots, s_{g,F}(t)]' \in \mathbb{C}^F$ comprises the entries of the g-th row of S(t).

Method 1000 may be implemented as a series of modules, either functioning alone or in concert, with physical electronic and computer hardware devices. Method 1000 may be computer-implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

The performance of the proposed broadband tracking algorithm is illustrated on the third Shallow-Water Evaluation Cell Experiment (SWellEX-3) dataset. The environment considered corresponds to that in the third Shallow-Water Evaluation Cell Experiment (SWellEX-3), see diagram 1100 shown in FIG. 12. In SWellEX-3, a towed source transmitting at frequencies $\{53+16 \text{ k}\}_{k=0}^{9}$ Hertz and a vertical line array 1110 collecting acoustic data were used. In this analysis, only 9 hydrophones, out of 64 hydrophones available, were used. These hydrophones were 11.25 m apart, having a total aperture of 90 m with the bottom element 6 m above the seafloor (water depth was 198 m).

Figure 12:
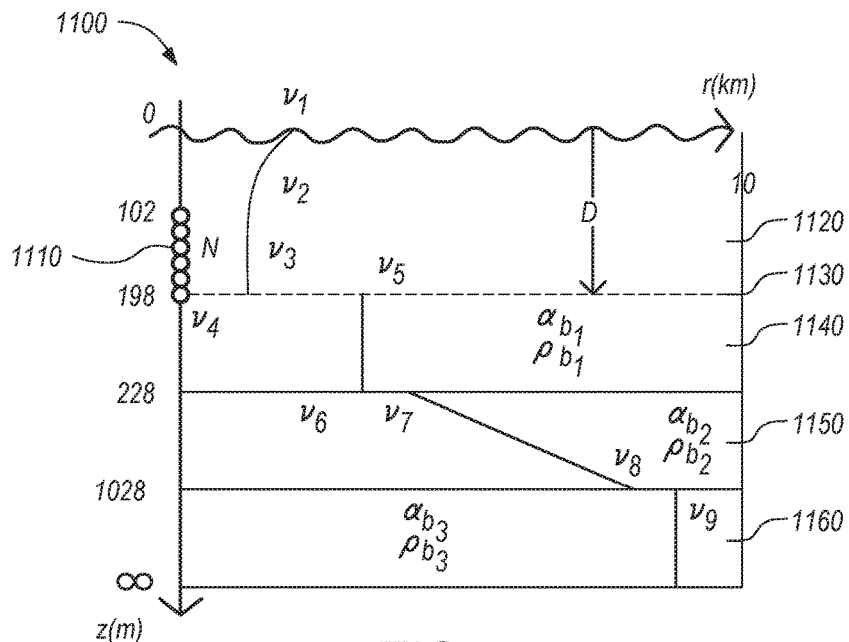
FIG. 12 shows a diagram of the model used to characterize the propagation environment of SWellEX-3.

A grid with G=20,000 locations spanning radial distances 0-10 km and depths 0-198 m was used, as shown by the top portion of the diagram 1120 ending at a depth of 198 m at line 1130. Depths between 198 m-228 m are represented by portion 1140, depths between 228 m-1028 m are represented by portion 1150, and depths below 1028 m are represented by portion 1160. The grid's radial and vertical spacing were 50 m and 2 m, respectively. All replicas were computed with the KRAKEN normal-mode propagation model using the environmental model as shown in FIG. 12.

Sample parameter values used in the model are: $v_1=1$; 520 m/s, $v_2=1$; 498 m/s, $v_3=1$; 490 m/s, $v_4=1$; 490 m/s, $v_5=1$; 572 m/s, $v_6=1$; 593 m/s, $v_7=1$; 881 m/s, $v_8=3$; 246 m/s, $v_9=5$; 200 m/s, $\alpha_{b_1}=0.2$ dB/m/kHz, $\alpha_{b_2}=0.06$ dB/m/kHz, $\alpha_{b_3}=0.02$ dB/m/kHz, $\rho_{b_1}=1.76$ g/cm3, $\rho_{b_2}=2.06$ g/cm3, and $\rho_{b_3}=2.66$ g/cm3.

Figure 13:
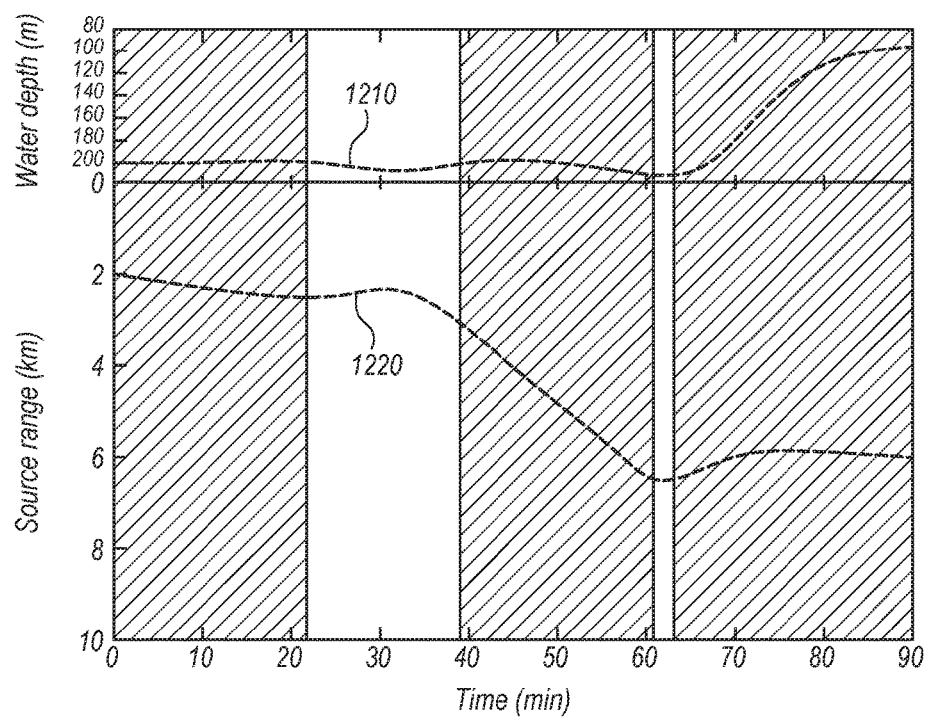
FIG. 13 shows a range track followed by a towed acoustic source during SWellEX-3 (bottom panel) and the water depth along its trajectory (top panel).

The top portion the diagram 1200 shown in FIG. 13 illustrates the bathymetry 1210 along the range trajectory of a towed acoustic source used during SWellEX-3, while the bottom portion of FIG. 13 shows the range trajectory 1220 of the towed acoustic source. Note that the model used reflects the initial portion of the bathymetry (up to time 60 min). After time 60 min., there is increasing mismatch between the model used and the true propagation environment whose effect will be seen in the final portions of the tracks to be described next. An embodiment of the methods disclosed herein can alleviate this mismatch by dynamically updating the acoustic propagation model used according to the appropriate bathymetric data along the direction on which the source is located. This embodiment will use source location estimates (Eq. 3) to dynamically modify the model-based predictor based on the current source locations.

Figure 14:
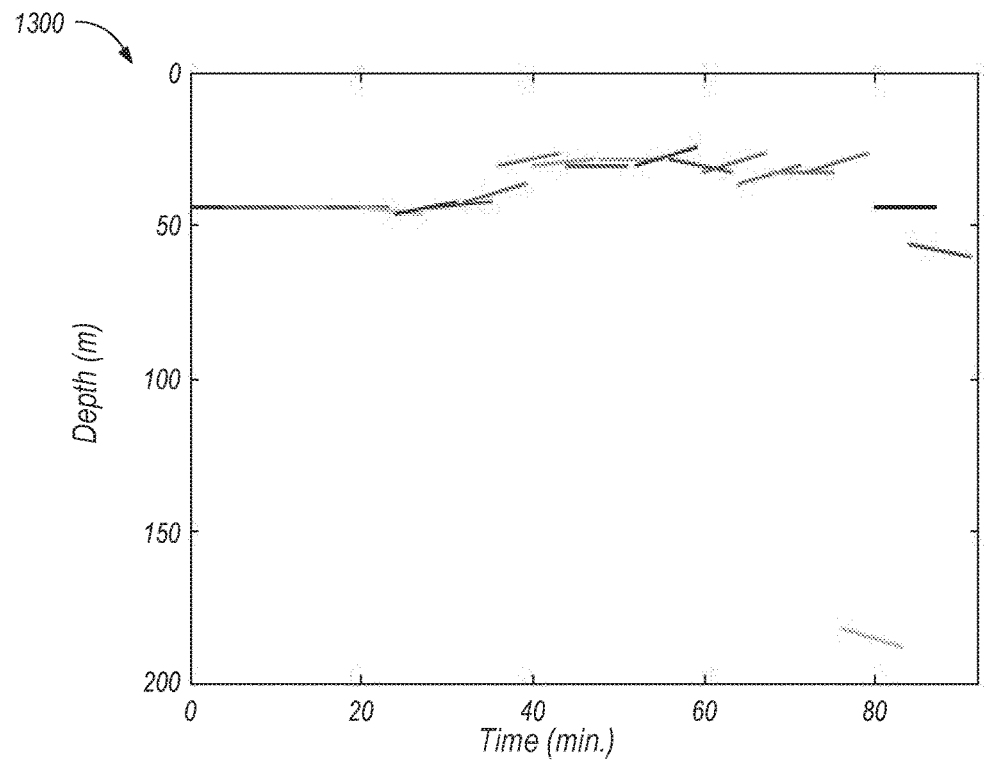
FIG. 14 shows a diagram illustrating an estimated depth track obtained for the source trajectory shown in FIG. 13 using matched-field tracking.
Figure 16:
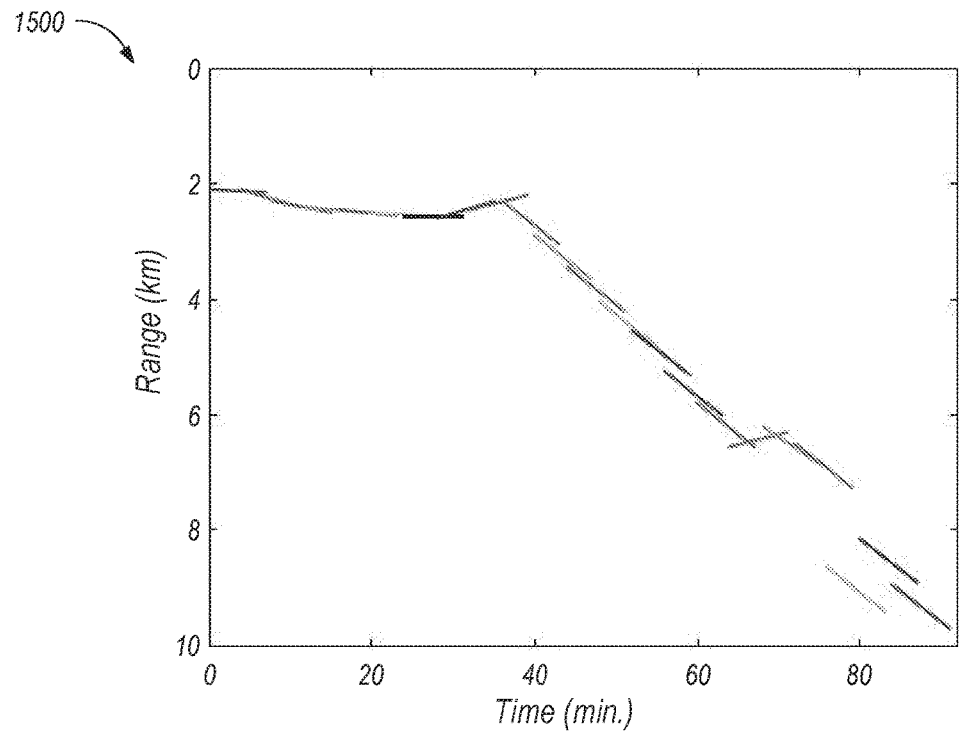
FIG. 16 shows a diagram illustrating an estimated range track obtained for the one source trajectory shown in FIG. 13 using matched-field tracking.

Referring to FIGS. 14 and 16, FIG. 14 shows a diagram 1300 illustrating depth tracks obtained for the source using matched-field tracking and FIG. 16 shows a diagram 1500 illustrating range tracks obtained for the source using matched-field tracking. MFT was used as a baseline for comparison. Despite its high computational complexity, MFT yields accurate track estimates for the single source case. Ambiguity surfaces obtained via Bartlett MFP, were used to construct partial linear trajectories, also known as tracklets. A total of 8 ambiguity surfaces were used to construct each tracklet. Each ambiguity surface accounts for 13.65 seconds of recorded data, and thus each tracklet corresponds to 109 seconds of recorded data. Note that there is a 50% overlap between consecutive tracklets.

Figure 15:
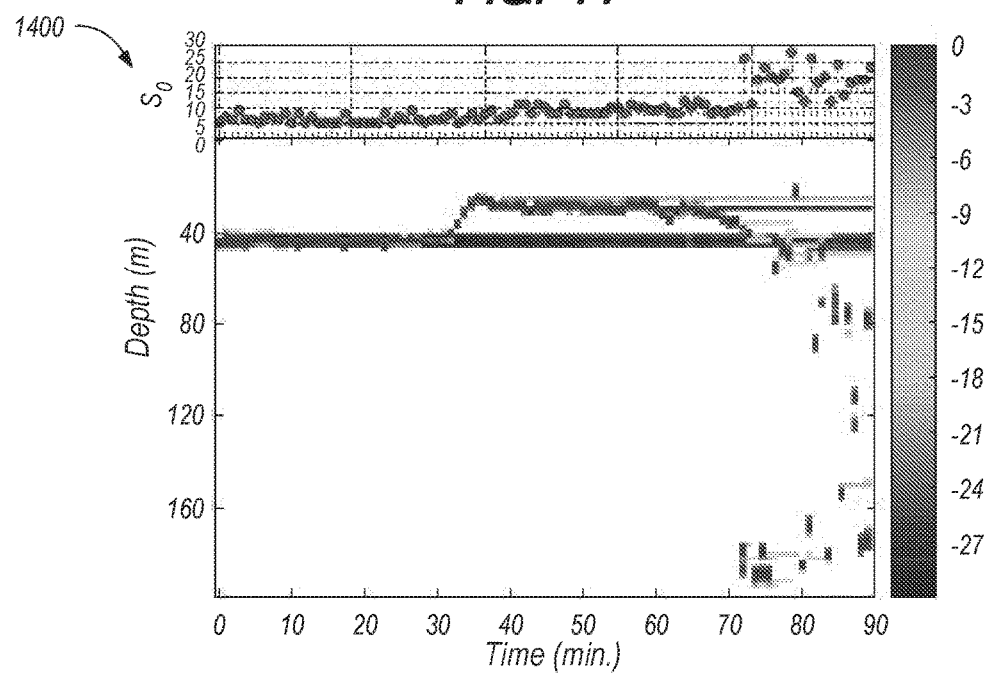
FIG. 15 shows a diagram illustrating an estimated depth track obtained for the source trajectory shown in FIG. 13 using an embodiment of a method in accordance with the Passive Tracking of Acoustic Sources with Sparse Innovations.
Figure 17:
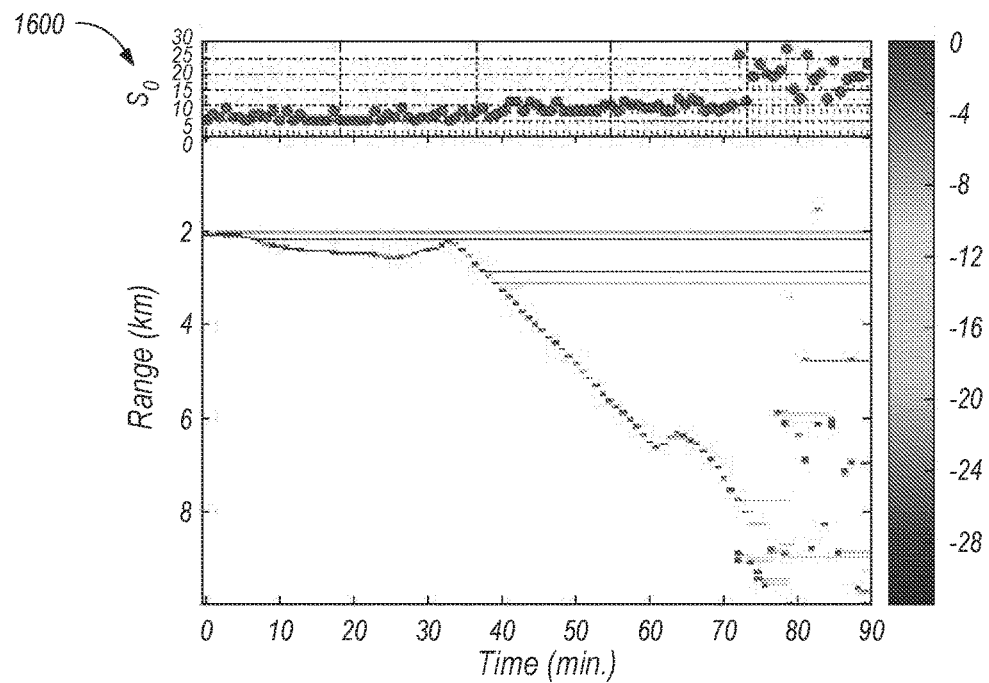
FIG. 17 shows a diagram illustrating an estimated range track obtained for the source trajectory shown in FIG. 13 using an embodiment of a method in accordance with the Passive Tracking of Acoustic Sources with Sparse Innovations.

Per time t, the ranges and depths of all peaks are plotted in diagram 1400 shown in FIG. 15 and diagram 1600 shown in FIG. 17. In these particular tests, the trajectory was broken into three different intervals for which different ($\lambda$, $\mu$) pairs were chosen. Although the tracks obtained give a coarse approximation to those followed by the source, it was expected that by dynamically adjusting the selection of, e.g., $\mu$, the gaps in the tracks could be removed. Note that these gaps appear because the choice of $\mu$ at those particular time instances was too high. Note also that both MFT and the proposed method fail to track the source after t=65 min. due to the severe mismatch between the environment and the model used to generate the replicas.

Figure 18:
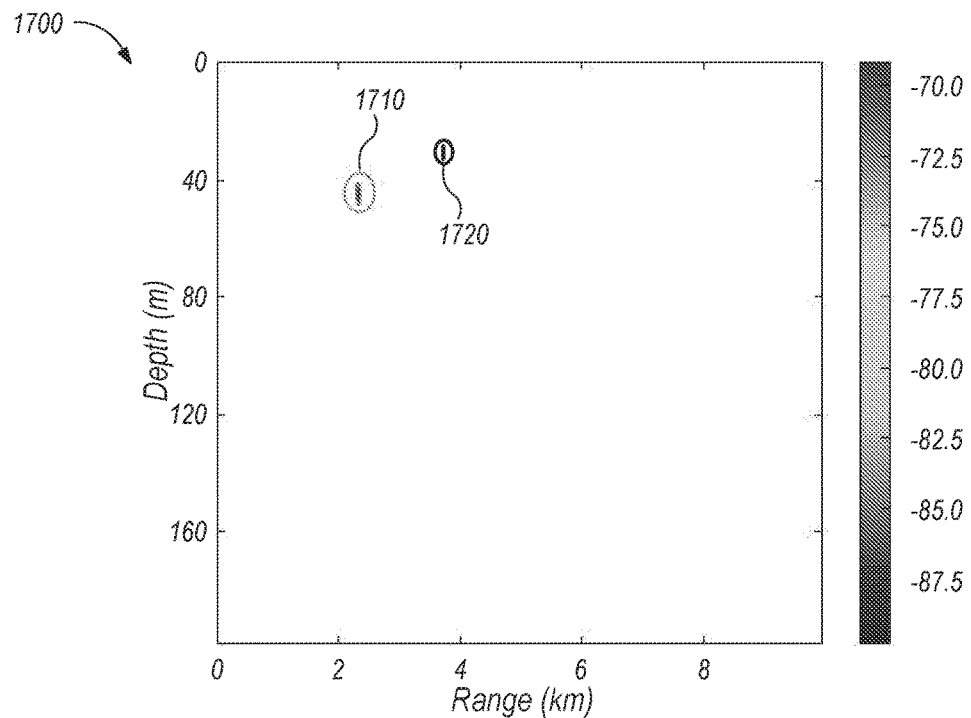
FIG. 18 shows a diagram illustrating a SLM obtained using an accelerated PG solver.

FIG. 18 shows a diagram 1700 illustrating a Source Location Map (SLM) obtained using a PG solver. As shown, reference 1710 represents the estimated source location, which in this case matches the true source location, while reference 1720 representing an artifact, i.e., non-zero entry in the SLM that does not correspond to a source location. The color bar on the right illustrates the intensity of each point on the map in a decibel (dB) scale. Note that the magnitude of the artifact is more than 10 dB below the magnitude of the point associated to the true source location.

Figure 19:
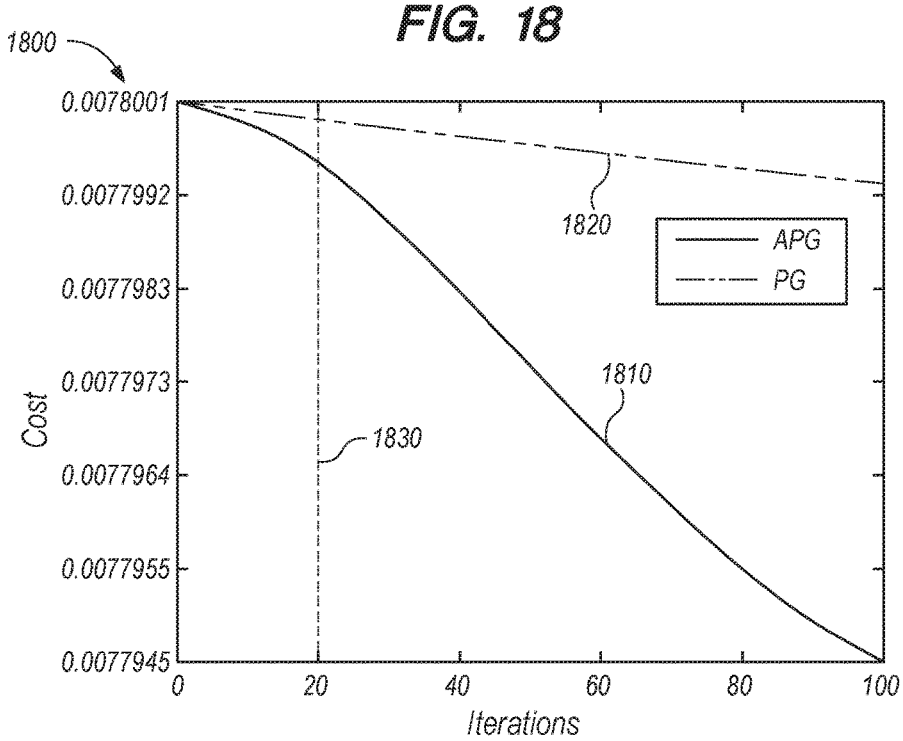
FIG. 19 shows a graph illustrating faster convergence using an accelerated PG solver versus a PG solver.

FIG. 19 shows a graph 1800 illustrating faster convergence using the accelerated PG (APG) solver outlined in FIG. 10 versus the PG solver outlined in FIG. 9, where line 1810 represents the cost versus iterations for the accelerated PG solver and line 1820 represents the cost versus iterations for the PG solver. In practice, only a few iterations of either algorithm were needed to correctly identify the support of the SLMs (up to 40 iterations in this case). The dashed line 1830 illustrates the iteration value at which both algorithms were stopped, and the cost function value achieved by the PG and APG algorithms.

In order to simulate the presence of two sources using the SWellEX-3 dataset, data corresponding to the portions of the trajectory illustrated in FIG. 13 between 0-25 mins. and 40-65 mins. (first and second colored panels from left to right) were combined after being rescaled to compensate for the signal-to-noise ratio difference between the two portions of the trajectory. In this case, the computational complexity of MFT, and correspondingly its execution time, increased dramatically since the algorithm connected all combinations of pairs of peaks across ambiguity surfaces. MFT was not able to distinguish the two sources possibly due to the width of the peaks on the ambiguity surfaces.

Figure 20:
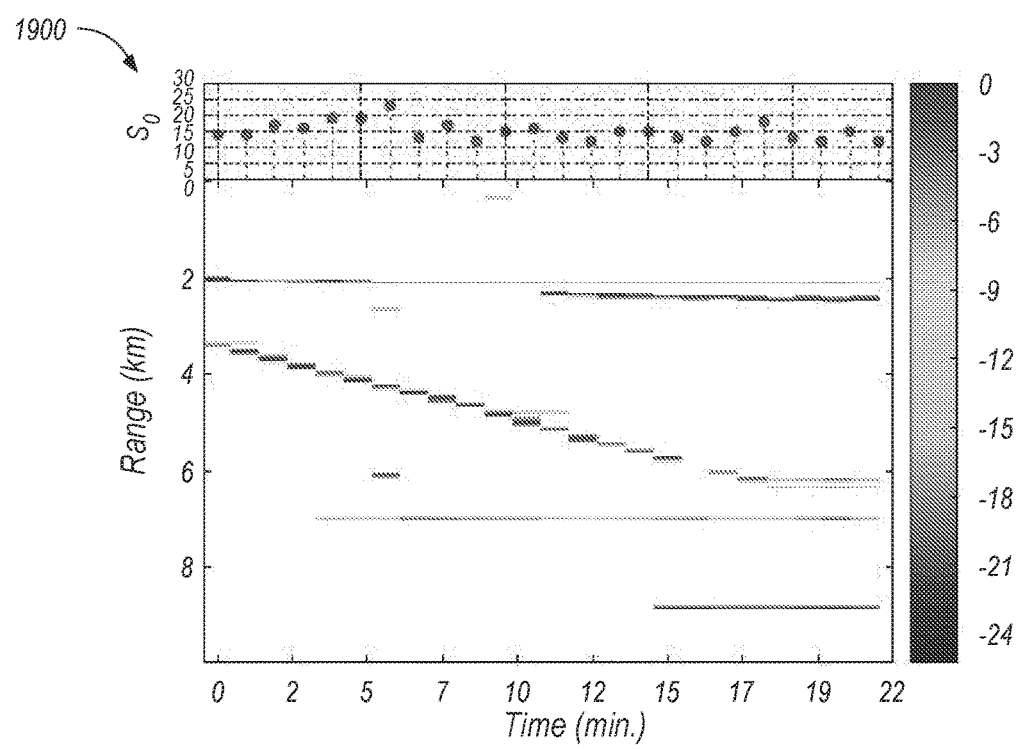
FIG. 20 shows a diagram illustrating range tracks obtained for two sources using an embodiment of a method in accordance with the Passive Tracking of Acoustic Sources with Sparse Innovations.

FIG. 20 shows a diagram 1900 illustrating range tracks obtained for two sources using an embodiment of a method in accordance with the Sparsity-Driven Tracking of Acoustic Sources. Similarly to the one source case, $\mu$ was adapted via grid search so as to obtain approximately 15 non-zero entries per SLM. The top portion of diagram 1900 in FIG. 20 illustrates the number of nonzero entries $S_0$ obtained per SLM. The bottom portion of diagram 1900 in FIG. 20 illustrates the estimated trajectories for the two sources, which as expected match portions of the one source trajectory shown in FIG. 13.

FIG. 20 illustrates the performance of an embodiment of the method disclosed herein when used to track the location of the two sources. Similarly to the one-source case, different ($\lambda$, $\mu$) pairs were chosen for different intervals of the trajectory. Although the trajectories of the two sources can be observed in range, it is difficult to separate the two sources in depth. As in the one source case, dynamic adjustment of the parameters is expected to help improve on the quality of the tracks obtained.

Although some embodiments of the method were discussed herein with regard to underwater source localization, some embodiments of the method may apply to other acoustic source localization environments, such as above water, where accurate in-air acoustic propagation models are available. Another possible extension involves using spatially distributed arrays for localization as a way to exploit spatial diversity to counteract multipath affects in the localization performance and to reduce the presence of surveillance gaps.

Many modifications and variations of the Sparsity-Driven Passive Tracking of Acoustic Sources are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A method comprising the steps of:
   determining a grid $\mathcal{G}$ of G tentative source locations $r_g$ to localize more than one acoustic sources, wherein a position of one of the acoustic sources at time t is denoted by $\{r_k(t) \in \mathbb{R}^d\}_{k=1}^K$, where d=[2, 3];
   using an acoustic model to compute replicas that correspond to simulated acoustic sources at locations in $\mathcal{G}$, wherein the replicas are model-predicted Fourier coefficient vectors at F frequencies $\{\omega_f\}_{f=1}^F$ corresponding to the acoustic pressure field as sampled by an acoustic sensor array having N sensors, where G>>max{KF, N} and K is a presumed number of acoustic sources;
   collecting, using the acoustic sensor array, time series data of actual acoustic measurements at each sensor of the acoustic sensor array caused by the acoustic sources;
   using a discrete-time Fourier transform (DFT) on the collected time series data to compute Fourier coefficients at frequencies $\{\omega_f\}_{f=1}^F$ for all N sensors;
   constructing DFT coefficient vectors $y_f(t):=[y_f^1(t), \ldots, y_f^N(t)]' \in \mathbb{C}^N$ using the Fourier coefficients previously obtained via the DFT, where $y_f^n(t)$ denotes the Fourier-coefficient estimate corresponding to $\omega_f$ at time t obtained from data gathered by the n-th sensor;
   modeling DFT coefficient vectors at $\omega_f$ as $y_f(t)=\Sigma_{g=1}^G s_{g,f}(t) p_{g,f} + \epsilon_f(t)$, f=1, ..., F, where $s_{g,f}(t)$ denotes the Fourier coefficient at $\omega_f$ of the spectrum corresponding to the acoustic signature of the acoustic source located at $r_g \in \mathcal{G}$ at time t, $p_{g,f} \in \mathbb{C}^N$ is the replica for $\omega_f$ corresponding to a source located at $r_g \in \mathcal{G}$ normalized so that $\|p_{g,f}\|_2=1$, and $\epsilon_f(t) \in \mathbb{C}^N$ denotes a zero-mean additive noise component;
   obtaining, at time t, an estimate $\hat{S}(t)$ according to the equation $$\text{argmin}_{S \in \mathbb{C}^{G \times F}} \frac{1}{2} \sum_{f=1}^F \|y_f(t) - P_f s_f\|_2^2 +$$

-continued $$\frac{\lambda}{2}\sum_{f=1}^{F}\|s_f(t)-\hat{s}_f(t-1)\|_2^2 + \mu\sum_{g=1}^{G}\|\varsigma_g\|_2,$$

where $S:=[s_1, \ldots, s_F]$, $\varsigma_g{}'$ is the g-th row of S, $P_f:=[p_{1,f}, \ldots, p_{G,f}] \in \mathbb{C}^{N \times G}$ is the matrix of replicas for $\omega_f$, and $\mu, \lambda > 0$ are tuning parameters; and constructing one or more source location maps (SLMs) over $\mathcal{G}$ per frequency $\omega_f$ using $\hat{S}(t)$, wherein each location on a particular SLM is associated with its corresponding acoustic gain estimate $\hat{s}_{g,f}(t)$, wherein estimates of the actual locations of the K presumed acoustic sources, $\{\hat{r}_k(t)\}_{k \in \kappa}$, correspond to the locations of the K-largest coefficients $|\hat{s}_{g,f}(t)|$ depicted in the SLM.

2. The method of claim 1, wherein the step of determining a grid $\mathcal{G}$ of G tentative source locations includes the step of estimating the number of acoustic sources.

3. The method of claim 1, wherein the step of constructing SLMs over $\mathcal{G}$ per frequency $\omega_f$ using $\hat{S}(t)$ comprises using each column $\hat{s}_f(t)$ of $\hat{S}(t)$ to construct the SLMs per frequency $\omega_f$.

4. The method of claim 1, wherein the step of constructing SLMs over $\mathcal{G}$ per frequency $\omega_f$ using $\hat{S}(t)$ comprises constructing a broadband SLM over $\mathcal{G}$ using $\hat{S}(t)$ by plotting the pairs $(r_g, \|\varsigma_g(t)\|_2)$ for all $r_g \in \mathcal{G}$, where $\varsigma_g^{(t)}:=[s_{g,1}(t), \ldots, s_{g,F}(t)]' \in \mathbb{C}^F$ comprises the entries of the g-th row of S(t), where $S(t): =[s_1(t), \ldots, s_F(t)] \in \mathbb{C}^{G \times F}$ and $s_f(t): =[s_{1,f}(t), \ldots, s_{G,f}(t)]' \in \mathbb{C}^G$.

5. The method of claim 1, wherein the step of constructing SLMs over $\mathcal{G}$ per frequency $\omega_f$ using $\hat{S}(t)$ comprises constructing a broadband SLM over $\mathcal{G}$ using $\hat{s}_f(t)$ by plotting the pairs $(r_g, \|s_{g,f}\|_2)$ for all $r_g \in \mathcal{G}$, where $S(t): =[s_1(t), \ldots, s_F(t)] \in \mathbb{C}^{G \times F}$ and $s_f(t): [s_{1,f}(t), \ldots, s_{G,f}(t)]' \in \mathbb{C}^G$.

6. The method of claim 1, wherein the acoustic sources are underwater acoustic sources.

7. The method of claim 1, wherein the acoustic model is an underwater acoustic model.

8. The method of claim 1, wherein the acoustic sensor array is a hydrophone array.

9. A system comprising:

a processor operatively connected to an acoustic sensor array, wherein the processor is configured to perform the steps of:

determining a grid $\mathcal{G}$ of G tentative source locations $r_g$ to localize more than one acoustic sources, wherein a position of one of the acoustic sources at time t is denoted by $\{r_k(t) \in \mathbb{R}^d\}_{k=1}^K$, where d=[2, 3];

using an acoustic model to compute replicas that correspond to simulated acoustic sources at locations in $\mathcal{G}$, wherein the replicas are model-predicted Fourier coefficient vectors at F frequencies $\{\omega_f\}_{f=1}^F$ corresponding to the acoustic pressure field as sampled by an acoustic sensor array having N sensors, where G>>max{KF, N} and K is a presumed number of acoustic sources;

collecting, using the acoustic sensor array, time series data of actual acoustic measurements at each sensor of the acoustic sensor array caused by the acoustic sources;

using a discrete-time Fourier transform (DFT) on the collected time series data to compute Fourier coefficients at frequencies $\{\omega_f\}_{f=1}^F$ for all N sensors;

constructing DFT coefficient vectors $y_f(t):=[y_f^1(t), \ldots, y_f^N(t)]' \in \mathbb{C}^N$ using the Fourier coefficients previously obtained via the DFT, where $y_f^n(t)$ denotes the Fourier-coefficient estimate corresponding to $\omega_f$ at time t obtained from data gathered by the n-th sensor;

modeling DFT coefficient vectors at $\omega_f$ as $y_f(t)=\Sigma_{g=1}^G s_{g,f}(t)p_{g,f}+\epsilon_f(t)$, f=1, ..., F, where $s_{g,f}(t)$ denotes the Fourier coefficient at $\omega_f$ of the spectrum corresponding to the acoustic signature of the acoustic source located at $r_g \in \mathcal{G}$ at time t, $p_{g,f} \in \mathbb{C}^N$ is the replica for $\omega_f$ corresponding to a source located at $r_g \in \mathcal{G}$ normalized so that $\|p_{g,f}\|_2=1$, and $\epsilon_f(t) \in \mathbb{C}^N$ denotes a zero-mean additive noise component;

obtaining, at time t, an estimate $\hat{S}(t)$ according to the equation $$\operatorname{argmin}_{S \in \mathbb{C}^{G \times F}} \frac{1}{2}\sum_{f=1}^{F}\|y_f(t)-P_f s_f\|_2^2 +$$

$$\frac{\lambda}{2}\sum_{f=1}^{F}\|s_f(t)-\hat{s}_f(t-1)\|_2^2 + \mu\sum_{g=1}^{G}\|\varsigma_g\|_2,$$

where $S:=[s_1, \ldots, s_F]$, $\varsigma_g{}'$ is the g-th row of S, $P_f:=[p_{1,f}, \ldots, p_{G,f}] \in \mathbb{C}^{N \times G}$ is the matrix of replicas for $\omega_f$, and $\mu, \lambda > 0$ are tuning parameters; and constructing one or more source location maps (SLMs) over $\mathcal{G}$ per frequency $\omega_f$ using $\hat{S}(t)$, wherein each location on a particular SLM is associated with its corresponding acoustic gain estimate $\hat{s}_{g,f}$, wherein estimates of the actual locations of the K presumed acoustic sources, $\{\hat{r}_k(t)\}_{k \in \kappa}$, correspond to the locations of the K-largest coefficients $|\hat{s}_{g,f}(t)|$ depicted in the SLM.

10. The system of claim 9, wherein the step of determining a grid $\mathcal{G}$ of G tentative source locations includes the step of estimating the number of acoustic sources.

11. The system of claim 9, wherein the step of constructing SLMs over $\mathcal{G}$ per frequency $\omega_f$ using $\hat{S}(t)$ comprises using each column $\hat{s}_f(t)$ of $\hat{S}(t)$ to construct the SLMs per frequency $\omega_f$.

12. The system of claim 9, wherein the step of constructing SLMs over $\mathcal{G}$ per frequency $\omega_f$ using $\hat{S}(t)$ comprises constructing a broadband SLM over $\mathcal{G}$ using $\hat{S}(t)$ by plotting the pairs $(r_g, \|\varsigma_g(t)\|_2)$ for all $r_g \in \mathcal{G}$, where $\varsigma_g^{(t)}:=[s_{g,1}(t), \ldots, s_{g,F}(t)]' \in \mathbb{C}^F$ comprises the entries of the g-th row of S(t), where $S(t): =[s_1(t), \ldots, s_F(t)] \in \mathbb{C}^{G \times F}$ and $s_f(t): = [s_{1,f}(t), \ldots, s_{G,f}(t)]' \in \mathbb{C}^G$.

13. The system of claim 9, wherein the step of constructing SLMs over $\mathcal{G}$ per frequency $\omega_f$ using $\hat{S}(t)$ comprises constructing a broadband SLM over $\mathcal{G}$ using $\hat{S}(t)$ by plotting the pairs $(r_g, \|s_{g,f}\|_2)$ for all $r_g \in \mathcal{G}$, where $S(t): =[s_1(t), \ldots, s_F(t)] \in \mathbb{C}^{G \times F}$ and $s_f(t):=[s_{1,f}(t), \ldots, s_{G,f}(t)]' \in \mathbb{C}^G$.

14. The system of claim 9, wherein the acoustic sources are underwater acoustic sources.

15. The system of claim 9, wherein the acoustic model is an underwater acoustic model.

16. The system of claim 9, wherein the acoustic sensor array is a hydrophone array.

17. A system comprising:

a processor operatively connected to an acoustic sensor array, wherein the processor is configured to perform the steps of:

determining a grid $\mathcal{G}$ of G tentative source locations $r_g$ to localize more than one underwater acoustic sources, wherein a position of one of the underwater acoustic sources at time t is denoted by $\{r_k(t) \in \mathbb{R}^d\}_{k=1}^K$, where d=[2, 3];

using an underwater acoustic model to compute replicas that correspond to simulated underwater acoustic sources at locations in $\mathcal{G}$, wherein the replicas are model-predicted Fourier coefficient vectors at F frequencies $\{\omega_f\}_{f=1}^{F}$ corresponding to the acoustic pressure field as sampled by an acoustic sensor array having N sensors, where G>>max{KF, N} and K is a presumed number of underwater acoustic sources;

collecting, using the acoustic sensor array, time series data of actual acoustic measurements at each sensor of the acoustic sensor array caused by the underwater acoustic sources;

using a discrete-time Fourier transform (DFT) on the collected time series data to compute Fourier coefficients at frequencies $\{\omega_f\}_{f=1}^{F}$ for all N sensors;

constructing DFT coefficient vectors $y_f(t):=[y_f^1(t), \ldots, y_f^N(t)]' \in \mathbb{C}^N$ using the Fourier coefficients previously obtained via the DFT, where $y_f^n(t)$ denotes the Fourier-coefficient estimate corresponding to $\omega_f$ at time t obtained from data gathered by the n-th sensor;

modeling DFT coefficient vectors at $\omega_f$ as $y_f(t) = \sum_{g=1}^{G} s_{g,f}(t) p_{g,f} + \epsilon_f(t)$, $f=1, \ldots, F$, where $s_{g,f}(t)$ denotes the Fourier coefficient at $\omega_f$ of the spectrum corresponding to the acoustic signature of the underwater acoustic source located at $r_g \in \mathcal{G}$ at time t, $p_{g,f} \in \mathbb{C}^N$ is the replica for $\omega_f$ corresponding to a source located at $r_g \in \mathcal{G}$ normalized so that $\|p_{g,f}\|_2 = 1$, and $\epsilon_f(t) \in \mathbb{C}^N$ denotes a zero-mean additive noise component;

obtaining, at time t, an estimate $\hat{S}(t)$ according to the equation $$\operatorname{argmin}_{S \in \mathbb{C}^{G \times F}} \frac{1}{2} \sum_{f=1}^{F} \|y_f(t) - P_f s_f\|_2^2 +$$

$$\frac{\lambda}{2} \sum_{f=1}^{F} \|s_f(t) - \hat{s}_f(t-1)\|_2^2 + \mu \sum_{g=1}^{G} \|\varsigma_g\|_2,$$

where $S := [s_1, \ldots, s_F]$, $\varsigma_g'$ is the g-th row of S, $P_f := [p_{1,f}, \ldots, p_{G,f}] \in \mathbb{C}^{N \times G}$ is the matrix of replicas for $\omega_f$, and $\mu, \lambda > 0$ are tuning parameters; and constructing one or more source location maps (SLMs) over $\mathcal{G}$ per frequency $\omega_f$ using $\hat{S}(t)$, wherein each location on a particular SLM is associated with its corresponding acoustic gain estimate $\hat{s}_{g,f}$, wherein estimates of the actual locations of the K presumed underwater acoustic sources, $\{\hat{r}_k(t)\}_{k \in \kappa}$, correspond to the locations of the K-largest coefficients $|\hat{s}_{g,f}(t)|$ depicted in the SLM.

18. The system of claim 17, wherein the acoustic sensor array is a hydrophone array.

* * * * *